(12) United States Patent
Hashimoto et al.

(10) Patent No.: US 6,805,492 B2
(45) Date of Patent: *Oct. 19, 2004

(54) FERRULE PRODUCT, METHOD OF MAKING THE SAME, AND OPTICAL MODULE

(75) Inventors: Jun-ichi Hashimoto, Yokohama (JP); Takashi Kato, Yokohama (JP); Manabu Shiozaki, Yokohama (JP); Naoki Karikomi, Chigasaki (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 279 days.

This patent is subject to a terminal disclaimer.

(21) Appl. No.: 10/097,129

(22) Filed: Mar. 14, 2002

(65) Prior Publication Data

US 2002/0150356 A1 Oct. 17, 2002

(30) Foreign Application Priority Data

Mar. 14, 2001 (JP) ...................................... P2001-072552

(51) Int. Cl.[7] ................................................. G02B 6/36
(52) U.S. Cl. ............................... 385/88; 385/91; 385/92
(58) Field of Search ............................. 385/88, 90, 91, 385/92, 37

(56) References Cited

U.S. PATENT DOCUMENTS 6,394,665 B1 * 5/2002 Hayashi ....................... 385/88

OTHER PUBLICATIONS

"Fiber–Grating Based Dense WDM Transmitters", Mehrdad Ziari, et al., NFOEC97, pp. 503–512.
2.5 Gbit/s directly–modulated fibre grating laser for WDM networks, F.N. Timofeev, et al., Electronics Letters 31st Jul. 1997, vol. 33, No. 16, pp. 1406–1407.
"Fiber–Grating External–Cavity Laser Diode Module for 2.5 Gb/s Dense WDM Transmission", Toshio Takagi, et al., ECOC'98, Sep. 20–24, 1998, pp. 81–82.
"Fiber–Grating Semiconductor Laser Modules for Dense–WDM Systems*", Takashi Kato, et al., IEICE Trans. Eelctron., vol., E82–C, No. 2, Feb. 1999, pp. 357–359.
"A Wavelength Stable Uncooled Laser for Access Networks", R.J. Campbell, et al., Proc. 21st Eur. Conf. On Opt. Comm. (ECOC'95–Brussels) pp. 545–548.
"Low–Chirp, 2.5 Gbit/s directly modulated fiber grating laser for WDM networks" F.N. Timofeev, et al., OFC '97 Technical Digest, p. 296.

* cited by examiner

Primary Examiner—Karl D. Flech
(74) Attorney, Agent, or Firm—Smith, Gambrell & Russell, LLP

(57) ABSTRACT

A ferrule product 30b is utilized in an optical module 5 comprising a semiconductor optical amplifier 55 having a pair of end facets. The ferrule product 30b comprises an optical fiber 51 and a ferrule 52. The optical fiber 51 has one end part, optically coupled with one of the pair of end facets, a first part including a grating 511 disposed at a predetermined position separated from one end part, and a second part different from the first part. The ferrule 52 has a capillary part 521 for holding the optical fiber 51 and a flange part 522 for holding the capillary part. The flange part 522 is disposed on the second part.

22 Claims, 13 Drawing Sheets

Fig.6A

| | LONGITUDINAL ELASTIC COEFFICIENT (GPa) | COEFFICIENT OF LINEAR EXPANSION ($1 \times 10^{-6}$ $K^{-1}$) |
|---|---|---|
| ZIRCONIA | 190 | 8.3 |
| CRYSTALLIZED GLASS | 82.0 | 2.7 |
| NEGATIVE THERMAL EXPANSION GLASS CERAMICS A | 27.0 | −8.0 |
| NEGATIVE THERMAL EXPANSION GLASS CERAMICS B | 53.0 | −7.0 |
| NEGATIVE THERMAL EXPANSION GLASS CERAMICS C | 67.0 | −5.5 |
| NEGATIVE THERMAL EXPANSION GLASS CERAMICS D | 100 | −2.5 |

Fig.6B

| | LONGITUDINAL ELASTIC COEFFICIENT (GPa) | COEFFICIENT OF LINEAR EXPANSION ($1 \times 10^{-6}$ $K^{-1}$) |
|---|---|---|
| STAINLESS STEEL | 200 | 10.4 |
| COVAR | 137 | 5.3 |

FERRULE PRODUCT, METHOD OF MAKING THE SAME, AND OPTICAL MODULE

BACKGROUND OF THE INVENTION

1. Field of the Invention

The present invention relates to a ferrule product, a method of making the same, and an optical module.

2. Related Background Art

As the transmission capacity of optical communications increases, wavelength division multiplexing transmission systems (hereinafter referred to as WDM transmission systems) have come in to use. Inconventional WDM transmission systems, those having a channel interval as narrow as about 50 GHz (wavelength interval of 400 pm) have been in practical use. As the light source for such a WDM transmission system, DFB lasers have mainly been in use.

SUMMARY OF THE INVENTION

Further increases in the transmission capacity of optical communications have recently been in demand. For responding to such a demand, WDM transmission systems having a narrower channel interval are necessary. However, the oscillation wavelength of a DFS laser greatly depends on its operating temperature and injection current. Therefore, when a DFB laser is used as a light source, a deterioration in transmission characteristic may occur in adjacent channels due to optical crosstalk. This optical crosstalk occurs, for example, when the oscillation wavelength greatly shifts due to fluctuations in current generated by changes over time during a long-term continuous operation. Since it is necessary for high-density WDM systems to narrow their channel intervals in particular, the occurrence of optical crosstalk may become a serious problem therein. Hence, an external cavity type fiber Bragg grating semiconductor laser constituted by a fiber Bragg grating and a semiconductor optical amplifier has been developed as a light source with further wavelength stability.

As disclosed in a literature (literature 1: M. Ziari, A. Mathur, H. Jeon, I. Booth & R. J. Lang, "FIBER-GRATING BASED DENSE WDM TRANSMITTERS," NFOEC97, pp. 503–512.), the oscillation wavelength of a fiber Bragg grating semiconductor laser is exclusively determined by the Bragg wavelength of the Bragg grating. Therefore, the temperature dependence of the oscillation wavelength of a fiber Bragg grating semiconductor laser is also determined by the temperature dependence of the Bragg wavelength of the fiber Bragg grating (which is very low, i.e., about 10 pm/K), and its dependence on the injection current to the semiconductor optical amplifier is also very small. Hence, its change in oscillation wavelength with respect to temperature and injection current is remarkably smaller than that in DFB lasers. In addition, when making a fiber Bragg grating, the Bragg wavelength of the fiber Bragg grating can be controlled so as to attain a desirable value more accurately than that of DFB lasers. Therefore, as disclosed in several literatures (literature 2: F. N. Timofeev, P. Bayvel, V. Mikhailov, O. A. Lavrova, R. Wayatt, R. Kashyap, M. Robertson, and J. E. Midwinter, "2.5 Gbit/s directly-modulated fiber grating laser for WDM networks," Electron. Lett. 1997, pp. 1406–1407.; literature 3: M. Ziari, A. Mathur, H. Jeon, I. Booth & R. J. Lang, "FIBER-GRATING BASED DENSE WDM TRANSMITTERS," NFOEC97, pp. 503–512.; literature 4: T. Takagi, T. Kato, G. Sasaki, A. Miki, S. Inano, K. Iwai, A. Hamanaka, M. Shigehara, "Fiber-grating external-cavity laser diode imodule for 2.5 Gb/s dense WDM transmission," Proc. ECOC 1998, pp.81–82.; and literature 5: T. Kato, T. Takagi, A. Hamanaka, K. Iwai, and G. Sasaki, "Fiber-Grating Semiconductor Laser Modules for Dense-WDM Systems," IEICE TRANS. ELECTRON., VOL. E82-C. No. 2, 1999, pp. 357–359.), fiber Bragg grating semiconductor lasers are remarkably superior to DFB lasers in terms of stability and controllability in wavelength.

As mentioned above, the oscillation wavelength of a fiber Bragg grating semiconductor laser is determined by the Bragg wavelength corresponding to the grating period of its fiber Bragg grating. Therefore, basically the temperature change rate of the oscillation wavelength of a fiber Bragg grating semiconductor laser should be nearly equal to the temperature change rate of the Bragg wavelength of its fiber Bragg grating. Namely, the temperature change rate of the Bragg wavelength of a fiber grating should be about 10 pm/K.

The inventors measured the temperature change rate of the oscillation wavelength of available fiber grating semiconductor lasers. In this measurement, the inventors found that the value of temperature change rate was about 17 pm/K, thus being remarkably greater than the value expected so far.

The inventors carried out various investigations and studies in order to solve the cause of sluch an abnormal value of temperature dependence. As a result, regarding the temperature dependence of oscillation wavelength, the inventors took notice of the structure of a ferrule for holding an optical fiber. FIG. 13 is a sectional view showing a ferrule product 8 used for technical studies. The ferrule product 8 comprises an optical fiber 81 and a ferrule 82. The ferrule 82 has a capillary part 821 for holding the optical fiber 81 and a flange part 822 for holding the capillary part 821.

As a result of various studies concerning the ferrule product 8, the inventors have found the tollowing fact: The material characteristics and structures of the flange part 822 and capillary part 821 affect the temperature change rate of the Bragg wavelength of the fiber Bragg grating, thereby increasing the temperature change rate of the oscillation wavelength of the fiber Bragg grating laser.

As can be understood from the foregoing explanation, the inventors have found that the oscillation wavelength of fiber Bragg grating semiconductor lasers fails to exhibit its expected stability with respect to temperature. It is unfavorable for the oscillation wavelength to have a large temperature dependence in the case of temperature controlled type fiber Bragg grating semiconductor lasers using a temperature controlling device such as Peltier device, since the burden on temperature control becomes heavier. On the other hand, uncooled fiber Bragg grating semiconductor lasers without temperature controller will be in great demand in access network system if their temperature dependence at present can be significantly reduced. In any case, it is essential that the temperature dependence of oscillation wavelength in fiber Bragg grating semiconductor lasers be lowered so as to achieve the required temperature characteristic.

Therefore, it is an object of the present invention to provide a ferrule product which can reduce the temperature change rate of the Bragg wavelength of fiber Bragg gratings, and a method of making the same; and further to provide an optical module which can reduce the temperature change rate of the oscillation wavelength of a fiber Bragg grating semiconductor laser.

One aspect of the present invention is the ferrule product utilized in an optical module comprising a semiconductor optical amplifier having a pair of end facets. The ferrule product comprises an optical fiber and a ferrule. The optical fiber has one end portion provided so as to be optically coupled with one of the pair of end facets of the semiconductor optical amplifier, a first optical fiber portion including a Bragg grating provided at a predetermined position distanced from the one end portion, and a second optical fiber portion different from the first optical fiber portion. The ferrule has a capillary portion for holding the optical fiber and a flange portion for holding the capillary portion, whereas the flange portion is provided on the second optical fiber portion.

According to this aspect of the present invention, since the flange portion is provided on the second optical fiber portion, the force applied by the flange portion onto the first optical fiber portion of the optical fiber as temperatire rises can be reduced. Therefore, the change in grating period with respect to temperature can be reduced.

In the ferrule product, material of the flange portion may have a coefficient of linear expansion smaller than that of material of the capillary portion. When the flange portion is deformed by heat, the thermal stress from the flange portion onto the capillary portion is reduced, whereby the stress from the capillary portion onto the optical fiber is also alleviated.

In the ferrule product, a material of the capillary portion may have a negative coefficient of linear expansion, whereas a material of the optical fiber may have a positive coefficient of linear expansion. The capillary portion having a negative coefficient of linear expansion shrinks as temperature rises, whereas the optical fiber having a positive coefficient of linear expansion expands as temperature rises. As a consequence, the optical fiber and the capillary portion reduce deformations therebetween. Therefore, the change in grating period with respect to temperature is reduced.

The ferrule product may be configured such that a material of the capillary portion has a positive coefficient of linear expansion smaller than that of zirconia, whereas the optical fiber has a positive coefficient of linear expansion. In this case, since the capillary portion is formed from a material having a positive coefficient of linear expansion smaller than that of zirconia, the magnitude of thermal stress applied by the capillary part onto the fiber becomes smaller than that in the case where zirconia is used, although the direction of thermal stress is the same. As a result, the change in grating period with respect to temperature is reduced. A preferred example of the material for forming the capillary portion is crystallized glass.

The ferrule product may further comprise a bonding member for bonding the capillary portion and the flange portion to each other. The capillary portion may contain at least one material of crystallized glass and negative thermal expansion glass ceramics. The bonding member makes it possible for the flange portion to hold the glass capillary portion exhibiting a low toughness.

Another aspect of the present invention is the ferrule product utilized in an optical module comprising a semiconductor optical amplifier having a pair of end facets. The ferrule product comprises an optical fiber and a ferrule. The optical fiber has one end portion provided so as to be optically coupled with one of the pair of end facets of the semiconductor optical amplifier, and a Bragg grating provided at a predetermined position distanced from the one end portion. The ferrule has a capillary portion for holding the optical fiber and a flange portion for holding the capillary portion. Material of the capillary portion has a negative coefficient of linear expansion, whereas material of the flange portion has a positive coefficient of linear expansion.

According to this aspect of the present invention, since the capillary portion is formed from material having a negative coefficient of linear expansion, the capillary portion shrinks as temperature rises, since the flange portion is formed from material having a positive coefficient of linear expansion, the flange portion expands as temperature rises. As a consequence, the capillary portion and the flange portion reduce deformations therebetween. Since the deformations partly cancel each other, this cancellation can reduce the deformation of the optical fiber caused by the deformation of flange portion. Therefore, the change in grating period with respect to temperature can be reduced.

In the ferrule product, the capillary portion may contain a negative thermal expansion glass ceramics material having a longitudinal elastic coefficient exceeding 27 GPa. A material having a longitudinal elastic coefficient exceeding 27 GPa provides an excellent temperature dependence in Bragg wavelength. A further excellent temperature dependence in Bragg wavelength is provided when the longitudinal elastic coefficient in the capillary portion is 53 GPa or greater.

The ferrule product may further comprise a bonding member for bonding the capillary portion and the flange portion to each other. The bonding member makes it possible for the flange portion to reliably hold the glass capillary part exhibiting a low toughness.

Another aspect of the present invention is the ferrule product utilized in an optical module comprising a semiconductor optical amplifier having a pair of end facets. The ferrule product comprises an optical fiber and a ferrule. The optical fiber has one end portion and a Bragg grating. The one end portion is provided so as to optically couple with one of the pair of end facets of the semiconductor optical amplifier. The grating is provided at a position separated from the one end portion by a predetermined distance. The ferrule has a capillary portion for holding the optical fiber and a flange portion for holding the capillary portion. Material of the flange portion has a coefficient of linear expansion smaller than that of stainless steel.

According to this aspect of the present invention, since the flange portion is formed from material having a coefficient of linear expansion smaller than that of stainless steel, the force applied by the flange portion onto the capillary portion as temperature rises can be reduced. Therefore, the stress occurring in the capillary portion is reduced. As a result, the force exerted from the capillary portion onto the optical fiber is reduced. Hence, the change in grating period with respect to temperature is lowered. A preferred example of the material for forming the flange portion is covar.

An optical module can be constructed by using the ferrule product in accordance with the present invention. The optical module comprises a semiconductor optical amplifier having a pair of end facets, and a ferrule product. The ferrule product comprises an optical fiber and a ferrule. Since the change in grating period with respect to temperature is reduced in the ferrule product in accordance with the present invention, the temperature change rate of the oscillation wavelength of the optical module decreases.

In the ferrule product, a material of the flange portion may have a coefficient of linear expansion lower than that of material of the capillary portion. When the flange portion is deformed by heat, the thermal stress from the flange portion onto the optical fiber is reduced.

The capillary portion may contain at least one material of crystallized glass and negative thermal expansion glass ceramics. Each of these materials have a coefficient of linear expansion sufficiently smaller than that of zirconia.

The ferrule product may further comprise a bonding member for bonding the capillary portion and the flange portion to each other. The bonding member makes it possible to reliably assemble the glass capillary portion exhibiting a low toughness into the flange portion.

The optical module in accordance with the present invention may further comprise a mounting member, a tubular member, and a ferrule holder which are arranged along a predetermined axis. The mounting member has an arrangement face extending along a plane intersecting the predetermined axis, and a supporting portion, provided on the arrangement face, having a mounting face extending along the predetermined axis. The semiconductor optical amplifier is disposed on the mounting face. The tubular member extends along the predetermined axis, and has a first end portion secured to the arrangement face of the mounting member and a second end portion secured to the ferrule holder. The ferrule holder holds the ferrule along the predetermined axis. The optical fiber is provided as so to extend along the predetermined axis. Since the semiconductor optical amplifier is mounted on the mounting face, it is mounted without the aid of a temperature controlling device.

Another aspect of the present invention relates to a method of making a ferrule product. The ferrule product is utilized in an optical module comprising a semiconductor optical amplifier. This method comprises the steps of preparing a flange member having a first length, a capillary member having a second length longer than the first length, and an optical fiber comprising a first end portion and a Bragg grating, the Bragg grating being provided at a predetermined position separated from the first end portion, said Bragg grating having a third length, the capillary member comprising a first portion having at least the third length and a second portion having at least the first length; providing the flange portion at the second portion; and inserting the optical fiber into the capillary member such that the grating is positioned at the first portion.

This method makes it possible to insert the optical fiber such that the grating is positioned at the first portion of the capillary member, while the flange portion is arranged on the second portion of the capillary member.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 3A is a perspective view showing another embodiment of the ferrule product, whereas

FIGS. 6A and 6B are charts showing physical property values of ferrule materials employed in the optical modules shown in FIGS. 4 and 5;

FIGS. 12A to 12C are schematic views showing a method of making a ferrule product used in the optical module shown in FIG. 5, whereas

The above-mentioned objects and other objects, characteristic features, and advantages of the present invention will more easily be seen from the following detailed description of preferred embodiments of the present invention set forth with reference to the accompanying drawings.

DESCRIPTION OF THE PREFERRED EMBODIMENTS

The findings of the present invention can easily be understood in view of the following detailed description with reference to the accompanying drawings shown by way of example. In the following, embodiments of the present invention will be explained with reference to the drawings. When possible, parts identical to each other will be referred to with numerals or letters identical to each other.

First Embodiment

Figure 1A:
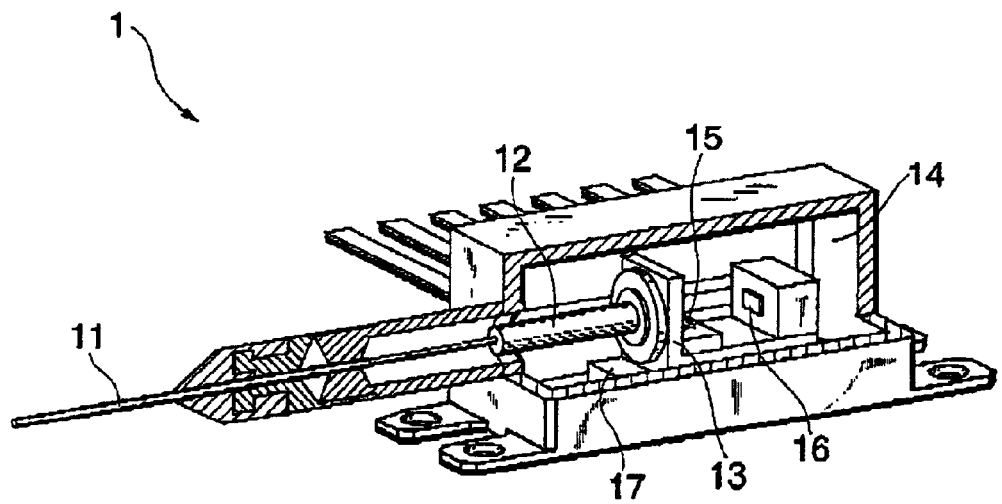
FIGS. 1A and 1B are perspective views showing an optical module in accordance with an embodiment of the present invention.
Figure 1B:
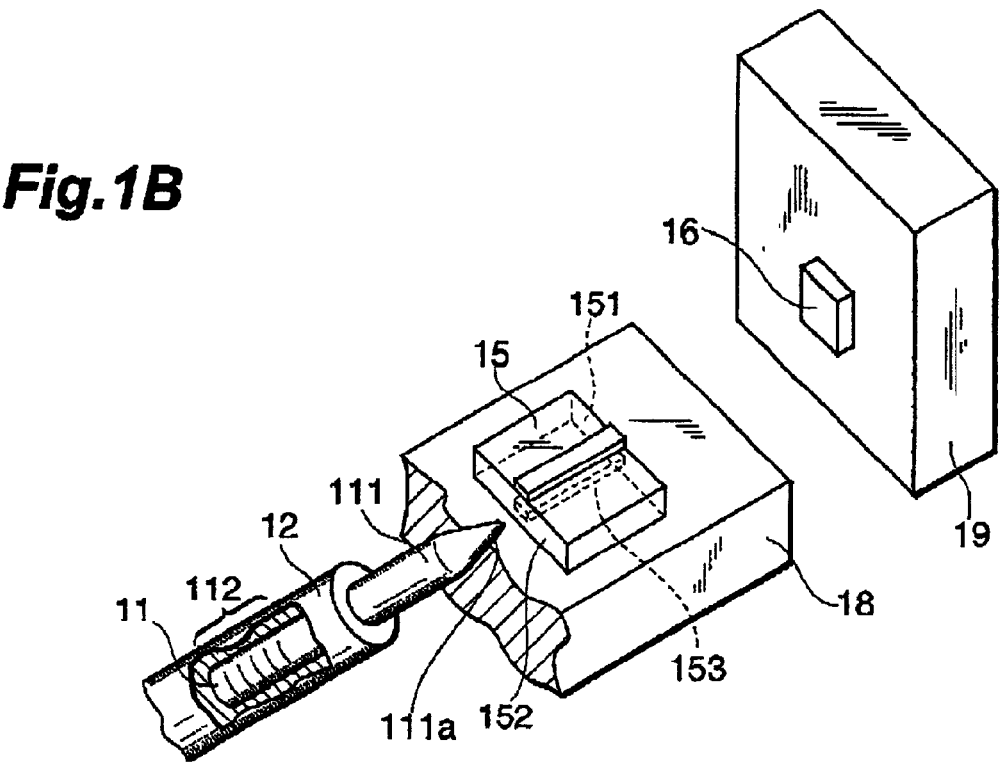

The optical module in accordance with a first embodiment of the present invention will be explained. FIG. 1A is a sectional perspective view showing the structure of the optical module, whereas FIG. 1B is a perspective view showing the arrangement of a semiconductor optical amplifier 15, an optical fiber 11, and a monitoring photo diode 16 within the optical module.

The optical fiber 11 has a lens-shaped end 111a. The lens-shaped end 111a improves the optical coupling between the semiconductor optical amplifier 15 and the optical fiber 11. The optical fiber 11 has a Bragg grating 112 in a core part separated from the lens-shaped end 111a by a predetermined distance. A ferrule 12 has a hole for inserting one end portion of the optical fiber 11 therein. The ferrule 12 accommodates the optical fiber 11 within its hole, and covers the side face of the core part of optical fiber 11 formed with the Bragg grating 112. The ferrule 12 has a capillary portion in contact with the optical fiber 11 and a flange portion covering the outer periphery thereof. The flange portion is secured to a mounting member 13 by welding such as YAG laser welding, for example, so as to be held by the mounting member 13. A first mount 18 and a second mount 19 are mounted on the mounting member 13, The first mount 18 mounts the semiconductor optical amplifier 15 thereon. The second mount 19 mounts the monitor photo diode 16 thereon. The mounting member 13 is disposed on a Peltier device 17, whereas the mounting member 13 and Peltier device 17 are accommodated in a housing such as a butterfly package 14.

The semiconductor optical amplifier 15 has a light-reflecting facet 151 aid a light-emitting facet 152. The light-reflecting facet 151 is provided with a coating having a high reflectivity. The light-emitting facet 152 is provided with a coating having a low reflectivity. The optical cavity of a fiber Bragg grating semiconductor laser is constructed by the light-reflecting facet 151 of the semiconductor optical amplifier 15 and the Bragg grating 112 of the optical fiber 11, thus enabling the fiber Bragg grating semiconductor laser to effect laser oscillation. On the other hand, the low-reflectivity coating on the light-emitting facet 152 suppresses the Fabry-Perot mode of the semiconductor laser amplifier 15, thereby stabilizing the oscillation of the fiber Bragg grating semiconductor laser.

Figure 2A:
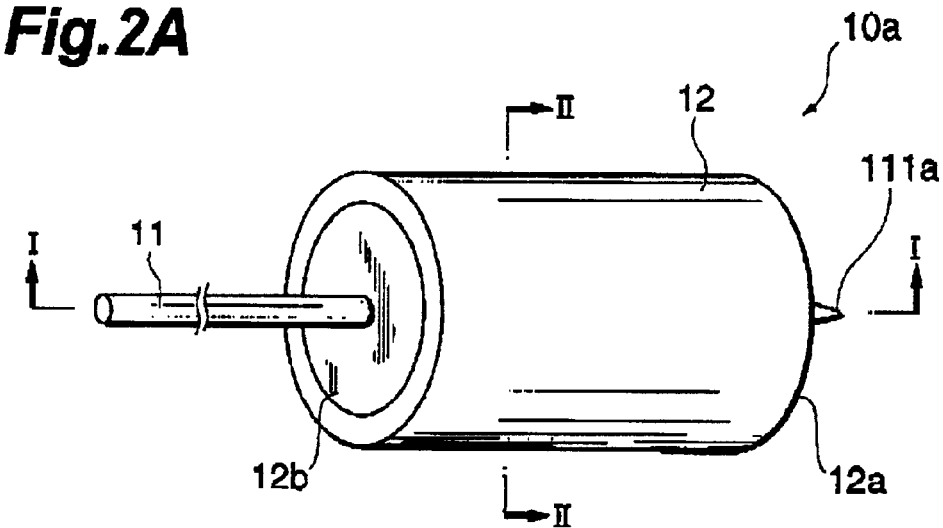
FIG. 2A is a perspective view showing a ferrule product used in the optical module shown in FIGS. 1A and 1B.
Figure 2B:
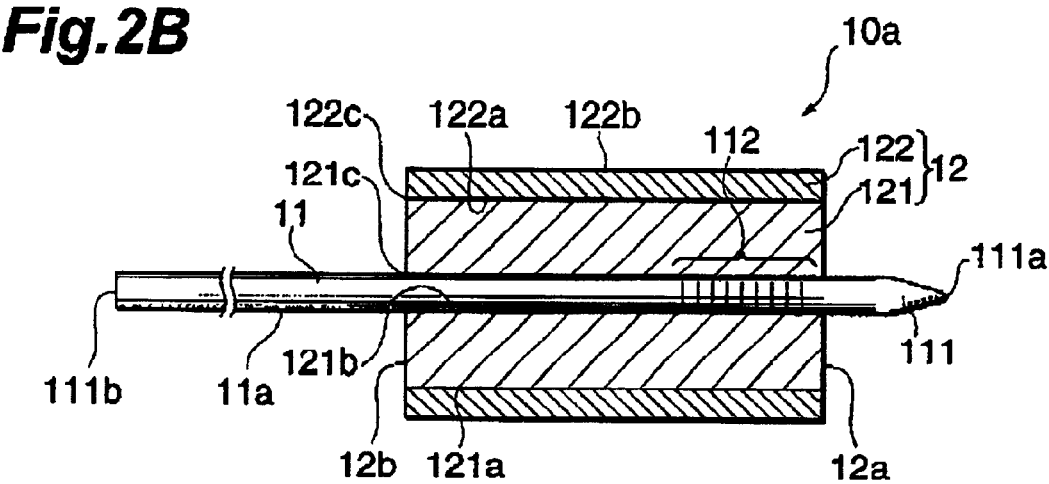
FIG. 2B is a sectional view taken along the line I—I of FIG. 2A.
Figure 2C:
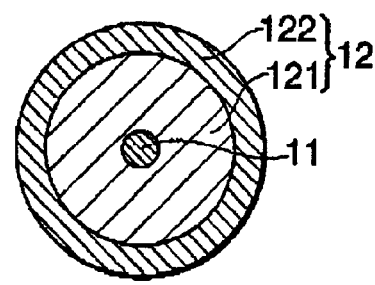
FIG. 2C is a sectional view taken along the line II—II of FIG. 2A.

FIG. 2A is a perspective view of the ferrule product. FIG. 2B is a sectional view of the ferrule product taken along the line I—I of FIG. 2A. FIG. 2C is a sectional view of the ferrule product taken along the line II—II of FIG. 2A. This ferrule product 10a comprises the ferrule 12 and the optical fiber 11. The ferrule 12 has a capillary portion 121 and a flange portion 122. The flange portion 122 holds the capillary portion 121. The ferrule 12 comprises one end face 12a and the other end face 12b. The ferrule 12 also has a body extending from one end face 12a to the other end face 12b. The lens-shaped end 111a of the optical fiber 11 projects from one end face 12a of the ferrule 12. The other end 111b of the optical fiber 11 extends out from the other end face 12b of the ferrule 12. The capillary portion 121 comprises an outer wall face 121a and an inner wall face 121b which extend in a predetermined axial direction. The capillary portion 121a also has a hole 121c constituted by the inner wall face 121b. The hole 121c extends in the predetermined axial direction so that the optical fiber 11 can be accommodated therein. The optical fiber 11 is accommodated in the hole 121c, and is supported by the capillary portion 121. The side face 11a of the optical fiber 11 extends along the inner wall face 121b. The flange portion 122 comprises an inner wall face 122a and an external wall face 122b, which extend in the predetermined axial direction. The inner wall face 122a defines a hole 122c provided so as to accommodate the capillary portion 121. When the capillary portion 121 is accommodated in the hole 122c, the inner wall face 122a extends along the outer side face 121a of the capillary portion 121. Each of the capillary portion 121 and flange part 122 is provided on the portion of optical fiber 11 where the Bragg grating 112 is positioned.

The capillary portion 121 is formed from material such as zirconia, crystallized glass, and negative thermal expansion glass ceramics. An example of the negative thermal expansion glass ceramics is a polycrystal of β-eucryptite ($LiO_2$—$Al_2O_3$—$2SiO_2$). When zirconia is used, a capillary having a high processing accuracy can be obtained at a low cost including the processing cost thereof. Also, since zirconia exhibits an excellent abrasion resistance when attaching/detaching the ferrule product in accordance with this embodiment to/from a connector, an excellent reliability is imparted to the ferrule product. Crystallized glass has a positive coefficient of linear expansion as with zirconia. Since crystallized glass is composed of glass materials as with the optical fiber, its coefficient of linear expansion and longitudinal elastic coefficient are not only closer to those of the optical fiber, but also remarkably lower than those of zirconia, i.e., about 30% and about 40% of those of zirconia, respectively. When the temperature of ferrule product changes, a thermal stress is applied by the capillary made of crystallized glass onto the grating fiber. However, this stress has a magnitude much smaller than that in the case of a capillary made of zirconia, but its direction is the same as that in the latter case. Therefore, the change in fiber Bragg grating period and its corresponding change in Bragg wavelength with respect to temperature are reduced. Hence, the temperature dependence of the oscillation wavelength of the fiber Bragg grating semiconductor laser is significantly reduced.

As temperature fluctuates, the capillary made of negative thermal expansion glass ceramics deforms so as to cancel the expansion and shrinkage of the optical fiber and flange, whereby the deformation of optical fiber caused by temperature changes can be made smaller. Therefore, the fluctuation in fiber Bragg grating period with respect to temperature can further be suppressed. As, a result, the temperature dependence of the oscillation wavelength of the fiber Bragg grating semiconductor laser can further be reduced.

The flange portion 122 holds the capillary portion 121. The flange portion 122 is secured to the mounting member 13 by YAG laser welding. Preferably, covar is used as the material of the flange portion 122. The coefficient of linear expansion and longitudinal elastic coefficient of covar are small, i.e., about 51% and about 69% of those of stainless steel, respectively. Therefore, when a thermal stress is applied from the flange to the fiber Bragg grating, its magnitude is smaller than that in the case where a flange made of stainless steel is used. The flange portion 122 made of covar makes it possible to reduce the fluctuation in fiber Bragg grating period with respect to temperature, whereby the temperature dependence of the oscillation wavelength of the fiber Bragg grating semiconductor laser canbe lowered.

Preferably, the capillary portion 121 is formed from negative thermal expansion glass ceramics having a longitudinal elastic coefficient or 53 GPa or greater. As will be explained later, even when stainless steel is used in a flange, the thermal stress applied from stainless steel to the fiber can be reduced if negative thermal expansion glass ceramics having a longitudinal elastic coefficient of 53 GPa or greater is used in the capillary, due to its negative expandability. The capillary made of negative thermal expansion glass ceramics makes it possible to reduce the change of fiber Bragg grating period with respect to temperature. This can reduce the temperature dependence of the oscillation wavelength of the fiber Bragg grating semiconductor laser, when negative thermal expansion glass ceramics having a longitudinal elastic coefficient of 53 GPa or greater is used in the capillary portion 121, not only covar but also stainless steel (SUS430) maybe utilized as material of the flange portion 122. Since the coefficient of linear expansion and longitudinal elastic coefficient of covar are smaller than those of stainless steel, the thermal stress applied from the flange portion made of covar to the fiber Bragg grating can be made smaller than that in the case where stainless steel is used in the flange. This can reduce the fluctuation of fiber Bragg grating period with respect to temperature. Therefore, the temperature dependence of the oscillation wavelength of the fiber Bragg grating semiconductor laser can be further reduced. Also, covar has a strength sufficient for tolerating the YAG laser welding carried out when assembling the optical module, and thus is suitable as a flange material. Using stainless steel is advantageous in its high processing accuracy, excellent durability, easiness in welding, high availability, and low price.

Second Embodiment

Figure 3A:
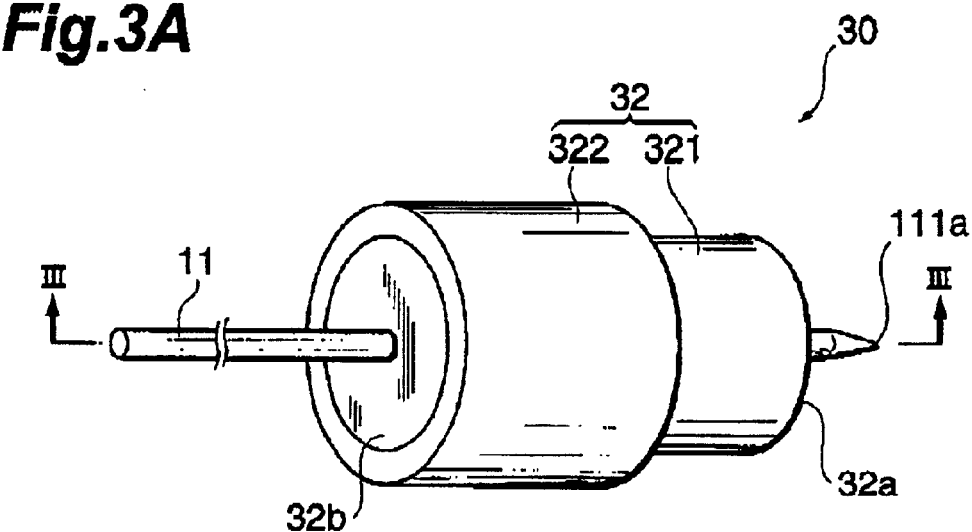
Figure 3B:
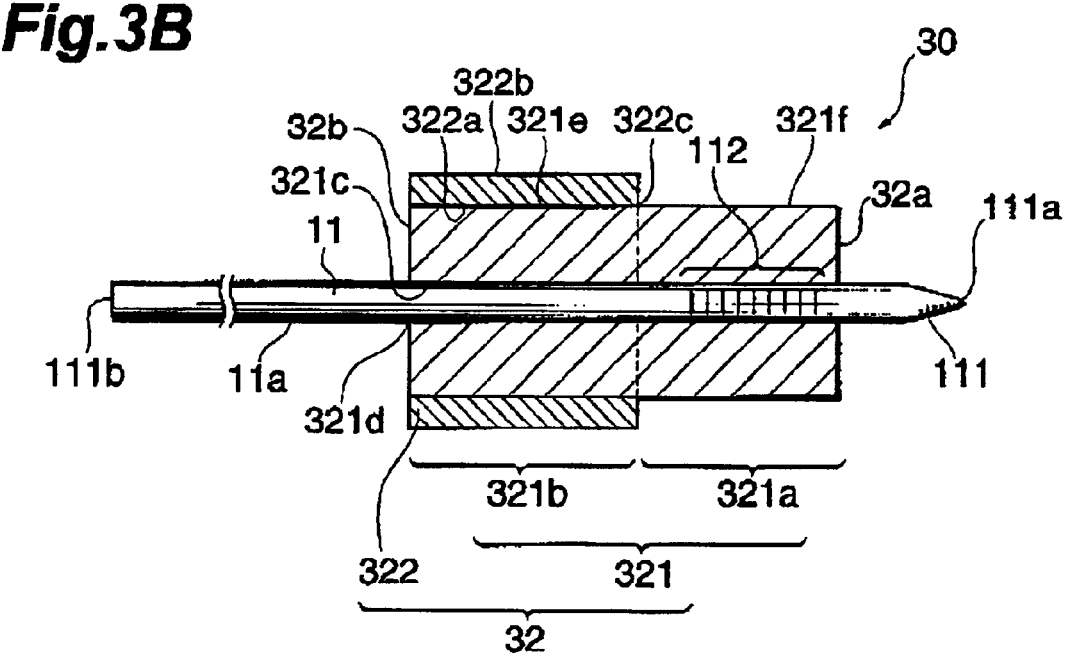
FIG. 3B is a sectional view taken along the line III—III of FIG. 3A.

FIG. 3A is a perspective view of a ferrule product. FIG. 3B is a sectional view of the ferrule product of FIG. 3A taken along the line III—III. This ferrule product 30 comprises a ferrule 32 and an optical fiber 11. The ferrule 32 has a capillary portion 321 and a flange portion 322. The flange portion 322 holds the capillary portion 321.

The capillary portion 321 has a first portion 321a and a second portion 321b. The first portion 321a covers the side face of the optical fiber 11, and this part of the optical fiber is provided with a fiber Bragg grating 112. The second portion 321b neighbors the first portion 321a and covers the side race of the optical fiber 11.

The ferrule 32 comprises one end face 32a and the other end face 32b. The ferrule 32 also has a body extending from one end face 32a to the other end face 32b. A lens-shaped end 11a of the optical fiber 11 projects from one end face 32a of the ferrule 32. The other end 111b of the optical fiber 11 extends out from the other end face 32b of the ferrule 32.

The capillary portion 321 comprises an inner wall face 321c extending in a predetermined axial direction. The inner wall face 321e defines a hole 321d. The hole 321d extends in the predetermined axial direction so that the optical fiber 11 can be accommodated therein. The optical fiber 11 is accommodated in the hole 321d, whereas the capillary portion 321 holds the optical fiber 11. The side face 11a of the optical fiber 11 extends along the inner wall face 321c. Also, the capillary portion 321 comprises a first outer wall face 321e and a second outer wall face 321f neighboring the first outer wall face 321e.

The flange portion 322 comprises an inner wall face 322a and an outer wall face 322b, which extend in the predetermined axial direction. The inner wall face 322a defines a hole 322c provided so as to accommodate the capillary portion 321 therein. When the capillary portion 321 is accommodated in the hole 322c, the inner wall face 322a extends along the first outer wall face 321e of the capillary portion 321. On the other hand, the second outer wall face 321f of the capillary portion 321 is not covered with the flange portion 322. The part of optical fiber 11 where the fiber Bragg grating 112 is positioned is not covered with the flange portion 322 but with the capillary portion 321.

The capillary portion 321 is formed from a material such as zirconia, crystallized glass, and negative thermal expansion glass ceramics. The flange portion 322 is formed from material such as covar and stainless steel (SUS430). The flange portion 322 can be secured to the mounting member 13 by YAG laser welding, for example. The flange portion 322 is disposed only on the second portion 321b of the capillary portion 321 in particular, not on the first part 321a of the capillary part 321. Therefore, the thermal stress from the flange part 322 is directly applied to the second portion 321b of the capillary portion 321, but not to the first portion 321a.

Third Embodiment

Figure 4:
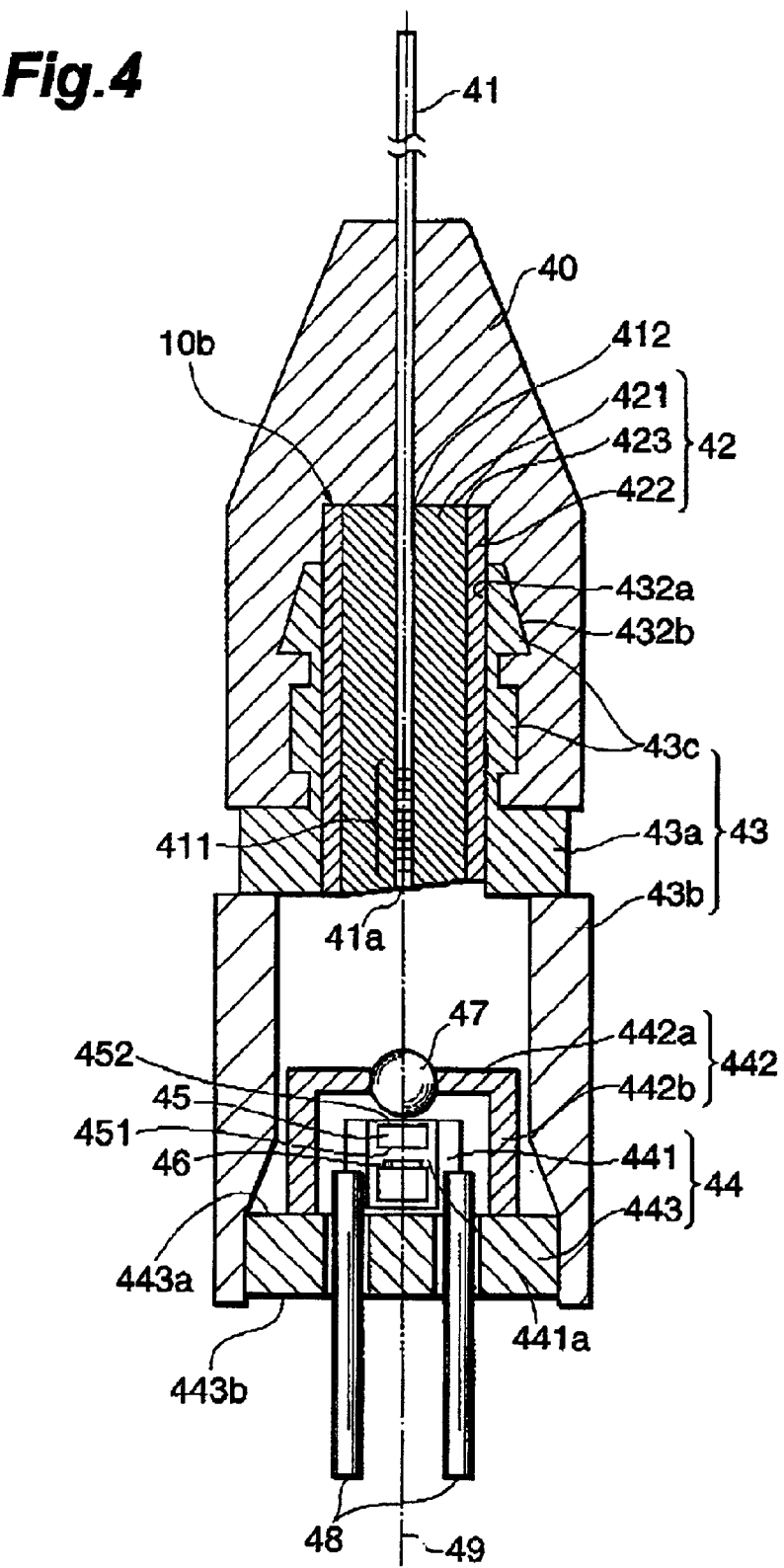
FIG. 4 is a sectional view showing an optical module in accordance with an embodiment of the present invention.

FIG. 4 is a sectional view showing the structure of an optical module in accordance with another embodiment. This optical module 4 comprises a ferrule product 10b, a protective member 40, a tubular member 43, and a mounting member 44. An example of the protective member 40 is a rubber cap. The tubular member 43 comprises a ferrule holder 43a and a spacer 43b. The mounting member 44, ferrule holder 43a, spacer 43b, ferrule product 10b, and protective member 40 are arranged along a predetermined axis 49.

The ferrule product 10b will now be explained. The ferrule product 10b comprises an optical fiber 41 and a ferrule 42. The optical fiber 41 has a fiber Bragg grating 411 at a position separated from one end part 41a by a predetermined distance The ferrule 42 comprises a capillary portion 421 covering the side face of the optical fiber 41, and a flange portion 422 covering the side face of the capillary portion 421. Each of the capillary portion 421 and flange portion 422 is a tubular member extending in a predetermined axial direction. The capillary portion 421 holds the optical fiber 41. The flange portion 422 holds the capillary portion 421.

The ferrule 42 covers the part of optical fiber 41 formed with the fiber Bragg grating 411. The flange portion 422 is positioned with respect to the ferrule holder 43a and then is secured to the ferrule holder 43a by welding such as YAG laser welding. The capillary portion 421 and flange portion 422 are secured to each other by a bonding member 423. Similarly, the capillary portion 421 and optical fiber 41 are secured to each other by a bonding member 412.

Each of the ferrule holder 43a and spacer 43b is a tubular member extending in the predetermined axial direction. The ferrule holder 43a is provided at one end of the spacer 43b. The mounting member 44 is provided at the other end of the spacer 43b. The ferrule holder 43a is provided with a tubular inner face 432a conforming to the outer periphery of the ferrule 42, and an outer face 432b provided with protrusions 43c each of which is shaped like a ring surrounding the predetermined axis 49. The rubber cap acting as the protective member 40 fits onto the protrusions 43c.

The mounting member 44 comprises a planar first portion 443 extending along a plane intersecting the predetermined axis 49, and a second portion 441 extending along the predetermined axis 49. The second portion 441 is provided so as to project from an arrangement face 443a of the first portion 443. On the mounting member 44, an accommodating member 442 is disposed so as to cover the first portion 443. The accommodating member 442 has a wall portion 442b extending along a predetermined axis, and a lens holding portion 442a disposed at one end of the wall portion 442b. The mounting member 44 and the accommodating member 442 provide a space for accommodating a semiconductor optical amplifier 45 and a monitoring photo diode 46. The other end of the wall portion 442b is fixed onto the arrangement face 443a. The second part 441 has a mounting face 441a extending along a plane intersecting the arrangement face 443a. The semiconductor optical amplifier 45 is disposed on the arrangement face 441a, whereas the monitoring photo diode 46 is disposed so as to be optically coupled with the back facet of the semiconductor optical amplifier 45. The lens holding portion 442a holds a lens 47. The lens 47 is positioned between the semiconductor optical amplifier 45 and one end part 41a of the optical fiber 41, and optically couples the semiconductor optical amplifier 45 and the optical fiber 41 to each other.

A plurality of lead terminals 48 extending in the predetermined axial direction are arranged in the mounting member 44, whereas each lead terminal 48 has an internal lead terminal part projecting from the arrangement face 443a and an external lead terminal part projecting from an installation face 443b. The lead terminals 48 are electrically connected to the semiconductor optical amplifier 45 and monitoring photo diode 46 by way of bonding wires.

The light-reflecting facet 451 of the semiconductor laser amplifier 45 is provided with a coating having a high reflectivity. Due to this coating, an optical cavity is constituted by the fiber Bragg grating and the light-reflecting facet 451, whereby the fiber Bragg grating semiconductor laser can effect laser oscillation. On the other hand, the light-emitting facet 452 of the semiconductor optical amplifier 45 is provided with a coating having a low reflectivity. This can suppress the Fabry-Perot modes of the semiconductor optical amplifier 45, thereby stabilizing the oscillation mode of the fiber Bragg grating semiconductor laser. When further mode stabilization is necessary, one end part 41a of the optical fiber 41 may be provided with a coating having a low reflectivity, or may be formed with a tilted face. The tilted face is inclined with respect to a plane orthogonal to the predetermined axis 49. The low-reflectivity coating and tilted face can reduce the reflected return light from one end part 41a to the semiconductor optical amplifier 45. The tilted face may be formed by grinding.

In this embodiment, as in the first embodiment, the capillary portion 421 is formed from a material such as zirconia, crystallized glass, and negative thermal expansion glass ceramics. The capillary material is used in combination with a metal material such as covar as a material of the flange portion 422 Preferably, the capillary portion 421 is formed from negative thermal expansion glass ceramics having a longitudinal elastic coefficient of 53 GPa or greater. A negative thermal expansion glass ceramics material is used in combination with a metal material such as covar and stainless steel (SUS430) as a material of the flange portion 422.

Fourth Embodiment

Figure 5:
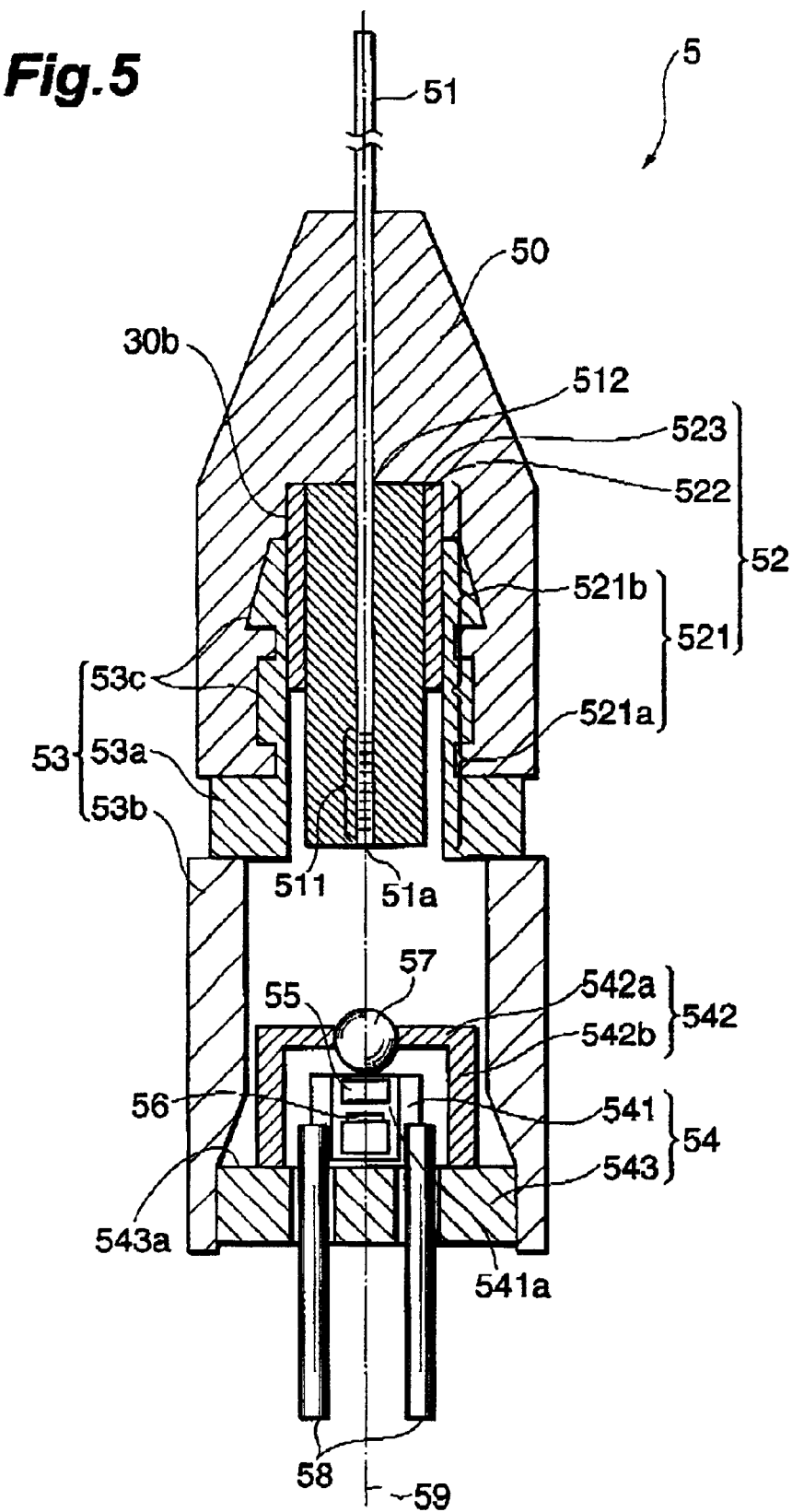
FIG. 5 is a sectional view showing an optical module in accordance with an embodiment of the present invention.

FIG. 5 is a sectional view showing the structure of the optical module in accordance with another embodiment. As for the structure of this optical module 5, features different from the structure of the optical module 4 shown in FIG. 4 will be explained. Although the optical module has a structure similar to that of the optical module 4 of FIG. 4, this embodiment should not be restricted to this structure. Main differences therebetween relate to a ferrule product 30b and a ferrule holder 53a. Namely, a rubber cap 50, a tubular member 53, a mounting member 54, a semiconductor optical amplifier 55, a monitoring photo diode 56, an accommodating member 542, a lens 57, and lead terminals 58 correspond to those of the embodiment shown in FIG. 4 in terms of their forms and arrangements, and are disposed along a predetermined axis 59.

The ferrule product 30b will now be explained. The ferrule product 30b comprises an optical fiber 51 and a ferrule 52 The optical fiber 51 is formed from silica glass. The optical fiber 51 has a fiber Bragg grating 511 at a position separated from one end part 51a by a predetermined distance. The ferrule 52 comprises a capillary portion 521 covering the side face of the optical fiber 51, and a flange portion 522 partly covering the side face of the capillary portion 521. Each of the capillary portion 521 and flange portion 522 is a tubular member extending in a predetermined axial direction. The capillary portion 521 comprises a first portion 521a and a second portion 521b. The first portion 521a holds the part of optical fiber 51 formed with the fiber Bragg grating 511. The second portion 521b holds the part of optical fiber 51 containing no fiber Bragg grating 511. The flange portion 522 holds the capillary portion 521.

While the first and second capillary portions 521a and 521b cover the part of optical fiber 51 formed with the fiber Bragg grating 511, the flange portion 522 covers the second capillary portion 521b. The capillary portion 521 is formed from a material such as zirconia, crystallized glass, and negative thermal expansion glass ceramics. The flange portion 522 holds the second portion 521b of the capillary portion 521. The flange portion 522 is positioned with respect to the ferrule holder 53a and then is secured to the ferrule holder 53a by welding such as YAG laser welding. The flange portion 522 is formed from material such as covar and stainless steel (SUS430) The capillary portion 521 and flange portion 522 are secured to each other by a bonding member 523. Similarly, the capillary portion 521 and optical fiber 51 are secured to each other by a bonding member 512, As shown in FIG. 5, the outer side face of the capillary portion 521a is not in contact with the inner side face of the ferrule holder 53a but separated therefrom.

Fifth Embodiment

Results of simulation carried out with respect to the optical module 4 shown in FIG. 4 will now be explained. This simulation was performed concerning the temperature change rate of the fiber grating Bragg wavelength. In the simulation, materials listed in FIG. 6A were used as the material of the capillary portion 421. FIG. 6B shows materials of the flange. Negative thermal expansion glass ceramics A to D shown in FIG. 6A are examples of commercially available materials among those mentioned above, and are prepared with such various longitudinal elastic coefficients and coefficients of linear expansions depending on their applications.

Conditions used in the simulation will now be listed. The diameter of the hole in the capillary portion 421 for inserting the optical fiber 41 is 0.126 mm. The thickness of the flange portion 422 is 0.625 mm. The flange portion 422 is formed from stainless steel (SUS430). The longitudinal elastic coefficient and coefficient of linear expansion of stainless steel (SUS430) are 200 GPa and $10.4 \times 10^{-6} K^{-1}$, respectively.

Figure 7:
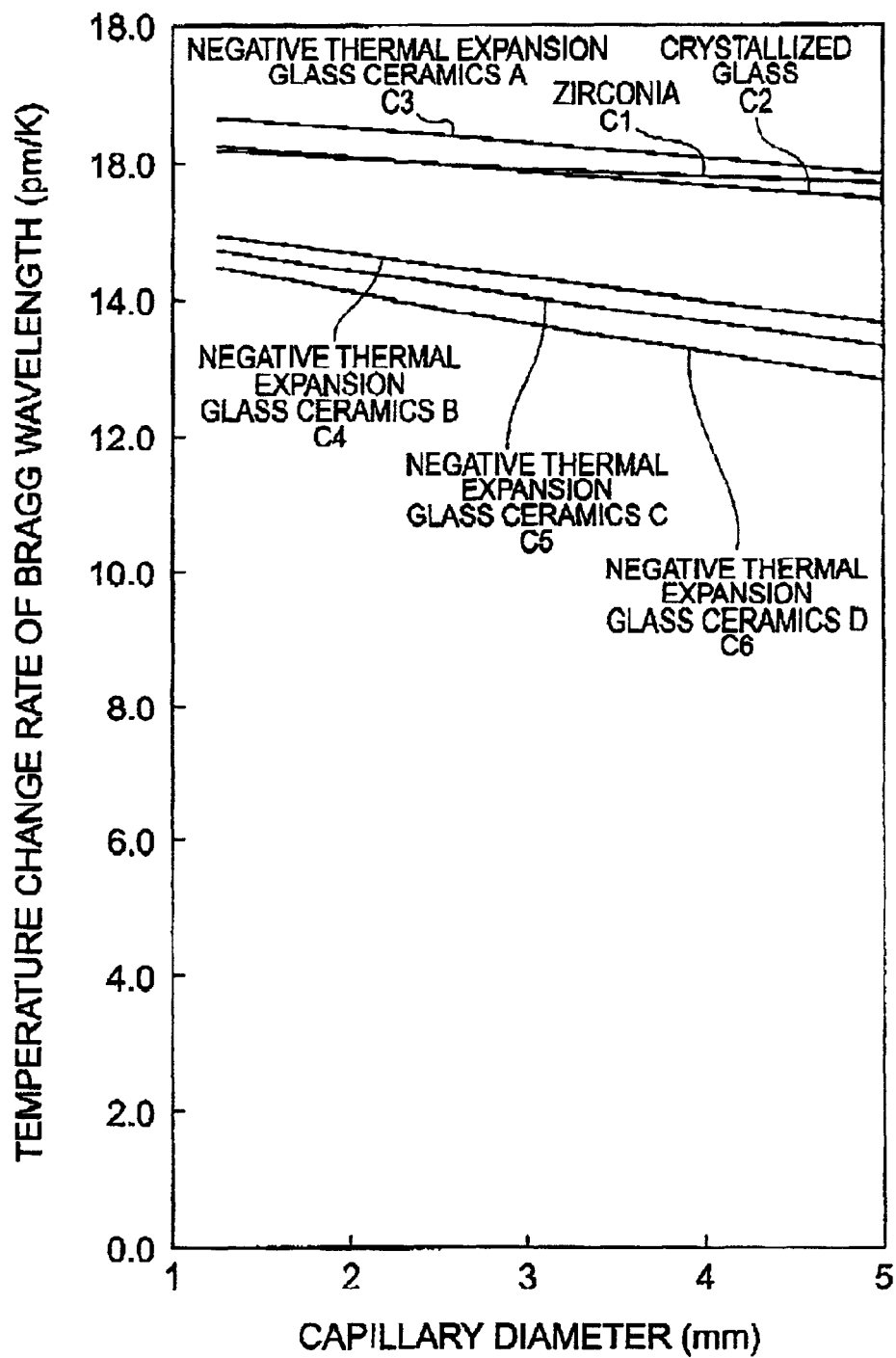
FIG. 7 is a graph showing results of simulation of the temperature change rate in fiber grating Bragg wavelength of the optical module shown in FIG. 4.

FIG. 7 shows results of calculation of the temperature change rate of the fiber grating Bragg wavelength according to the above-mentioned conditions. Calculations were carried out for several diameter values of the capillary portion 421. In FIG. 7, characteristic curves C1 to C6 show characteristics of ferrule products having capillary portions made of zirconia, crystallized glass, negative thermal expansion glass ceramics A, negative thermal expansion glass ceramics B, negative thermal expansion glass ceramics C, and negative thermal expansion glass ceramics D, respectively.

The characteristic curves shown in FIG. 7 indicate that the change rate of the fiber grating Bragg wavelength with respect to temperature is reduced when negative thermal expansion glass ceramics B to D having a longitudinal elastic coefficient of 53 Gpa or greater are used as the capillary material in comparison with the comparative ferrule product, and is also reduced when the diameter of the capillary portion 421 is increased.

Figure 13:
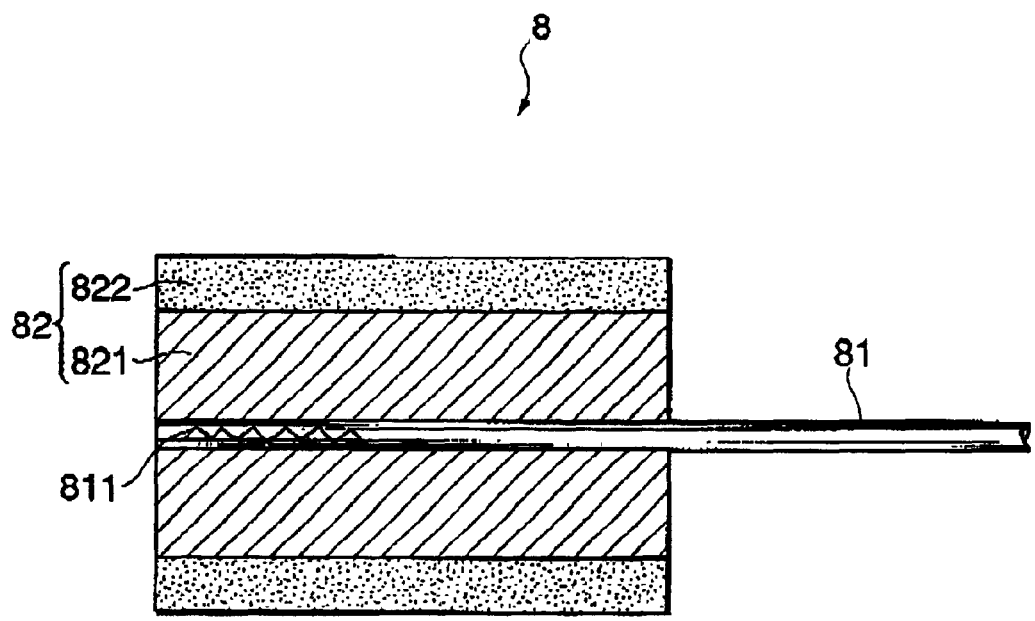
FIG. 13 is a sectional view showing a comparative ferrule product.

The comparative ferrule product uses stainless steel and zirconia in its flange and capillary, respectively, and has a characteristic indicated by the characteristic curve C1 shown in FIG. 7. For example, when the comparative ferrule product is explained with reference to the ferrule product 8 of FIG. 13, the optical fiber 81 is formed from silica glass, whose coefficient of linear expansion is $0.5 \times 10^{-6} K^{-1}$. The capillary 821 is formed from zirconia, whose coefficient of linear expansion is $8.3 \times 10^{-6} K^{-1}$. The flange 822 is formed from stainless steel (SUS430), whose coefficient of linear expansion is $10.4 \times 10^{-6} K^{-1}$. Therefore, the coefficient of linear expansion of the optical fiber 81 is sufficiently smaller than that of each of the capillary 821 and flange 822. The optical fiber 81 is secured to the capillary 821, whereas the capillary 821 is secured to the flange portion, 822. Hence, thermal stresses are applied to the optical fiber 81 from the capillary 821 and flange 822 depending on changes in temperature.

The longitudinal elastic coefficient (Young's modulus) of silica glass forming the optical fiber 81 is 73.2 GPa. The longitudinal elastic coefficient of zirconia forming the capillary portion 821 is 190 GPa, whereas that of stainless steel (SUS430) forming the flange portion 822 is 200 GPa. Therefore, the longitudinal elastic coefficient of the optical fiber 81 is smaller than that of each of the capillary portion 821 and flange portion 822. Hence, the optical fiber 81 is easier to expand/shrink than the capillary portion 821 and flange portion 822. As a result, the change in Bragg wavelength of the fiber Bragg grating 811 in the ferrule structure with respect to temperature is greater than the original temperature change in Bragg wavelength of the fiber Bragg grating.

Figure 8:
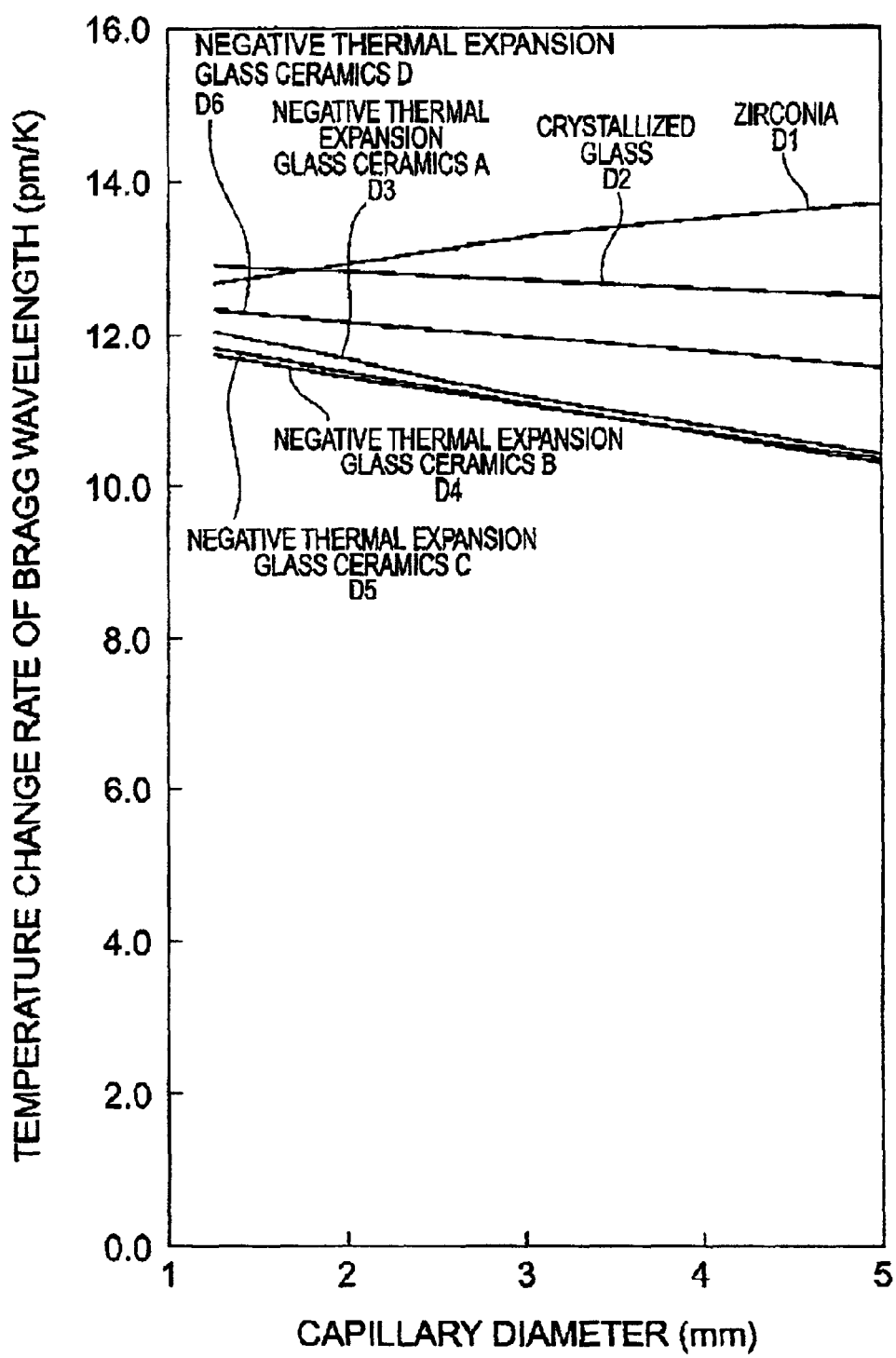
FIG. 8 is a graph showing results of simulation of the temperature change rate in fiber grating Bragg wavelength of the optical module shown in FIG. 4.

Results of simulation of the temperature change rate in fiber grating Bragg wavelength concerning the ferrule 42 having the flange portion 422 made of covar will now be explained. This simulation was carried out for several diameter values of the capillary portion 421. FIG. 8 shows results of the simulation. In the simulation, the longitudinal elastic coefficient and coefficient of linear expansion of covar are 137 GPa and $5.3 \times 10^{-6} K^{-1}$, respectively. In FIG. 8, characteristic curves D1 to D6 show characteristics of ferrule products having capillary portions made of zirconia, crystallized glass, negative thermal expansion glass ceramics A, negative thermal expansion glass ceramics B, negative thermal expansion glass ceramics C, and negative thermal expansion glass ceramics D, respectively.

When the results shown in FIG. 8 are compared with those of FIG. 7, the temperature change rate of the Bragg wavelength of the fiber Bragg grating is reduced in comparison with the comparative ferrule product no matter which material shown in FIG. 6A is employed. The comparative ferrule product uses stainless steel and zirconia in its flange and capillary, respectively, whereas the flange covers the whole side face of the capillary. Also, the results of FIG. 8 indicate that, when zirconia is used as the material of the capillary portion 421, the temperature change rate of the fiber grating Bragg wavelength is reduced as the diameter of the capillary portion 421 decreases. Further, the results of FIG. 8 indicate that, when crystallized glass and negative thermal expansion glass ceramics A to D are used as the material of the capillary portion 421, the temperature change rate of the fiber grating Bragg wavelength is reduced as the diameter of the capillary portion 421 increases.

Figure 9:
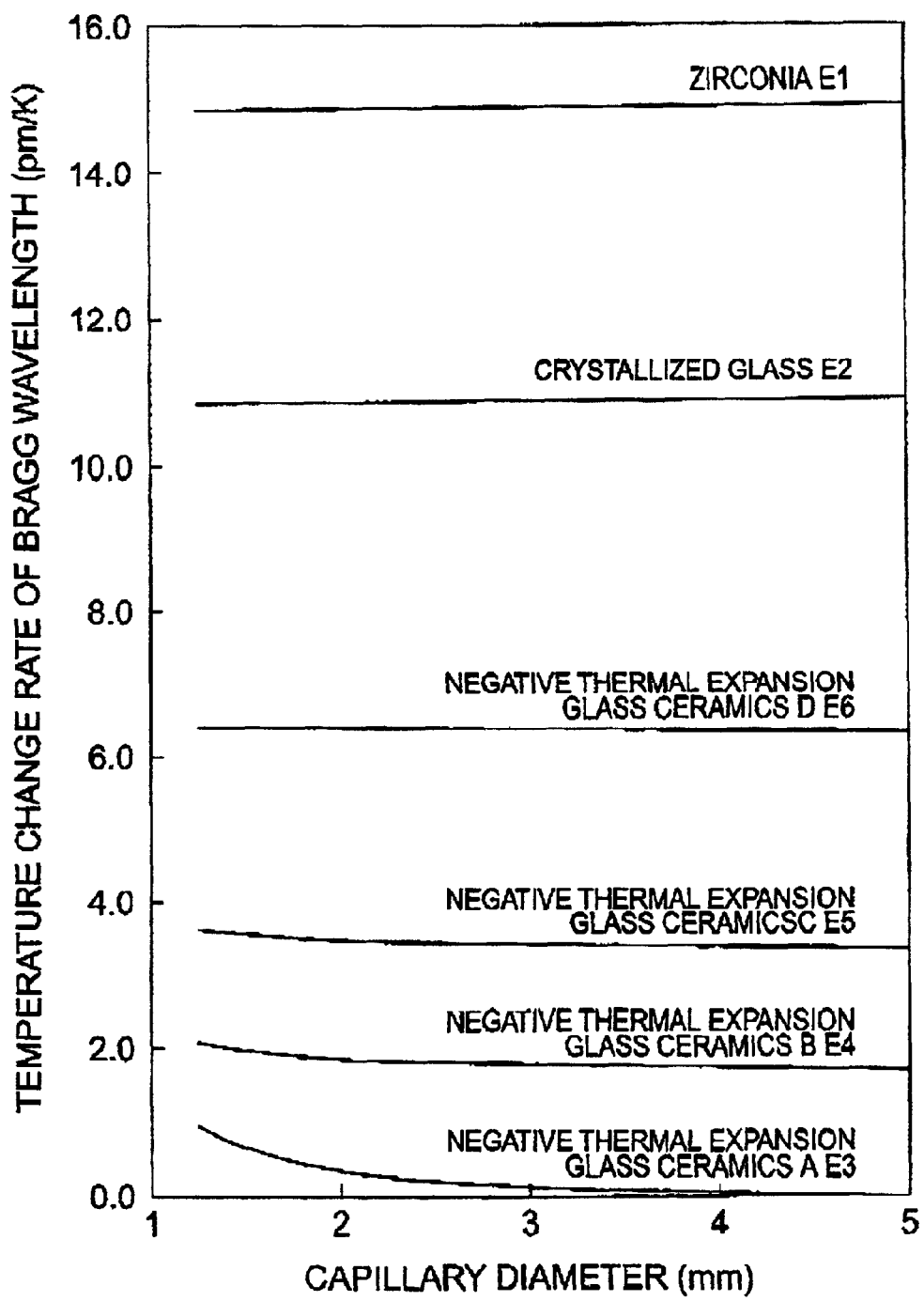
FIG. 9 is a graph showing results of simulation in which the temperature change rate in fiber grating Bragg wavelength of the optical module shown in FIG. 5 was calculated.

As for the optical module 5 shown in FIG. 5, results of simulation of the temperature change rate of the fiber grating Bragg wavelength will be explained. FIG. 9 shows the results of simulation concerning the temperature change rate of the fiber grating Bragg wavelength in the case where the diameter of the capillary portion is changed. In FIG. 9, characteristic curves E1 to E6 show characteristics of ferrule products having capillary portions made of zirconia, crystallized glass, negative thermal expansion glass ceramics A, negative thermal expansion glass ceramics B, negative thermal expansion glass ceramics C, and negative thermal expansion glass ceramics D, respectively. In this simulation, the materials listed in FIG. 6A are used as the material of the capillary portion 521. The hole formed at the center of the capillary portion 521 for inserting the optical fiber 51 therein has a diameter of 0.126 mm. The member of the flange portion 522 has a thickness of 0.625 mm. The flange portion 522 is formed from stainless steel (SUS430). The longitudinal elastic coefficient and coefficient of linear expansion of stainless steel (SUS430) are 200 GPa and $10.4 \times 10^{-6} K^{-1}$, respectively.

The results shown in FIG. 9 indicate that, since the flange portion 522 is disposed on the second portion 521b of the capillary portion, the influence of the flange portion 522 upon the temperature change rate of the fiber grating Bragg wavelength is small. Therefore, physical properties of the material used in the capillary portion 521 affect the temperature change rate of the fiber grating Bragg wavelength, when results of FIG. 9 and FIG. 7 are compared with each other, the change rate of the fiber grating Bragg wavelength with respect to temperature is reduced in FIG. 9 as compared with that in the comparative ferrule having the characteristic C1 shown in FIG. 7 no matter which material shown in FIG. 6A is used in the capillary. The comparative ferrule uses stainless steel and zirconia in its flange and capillary, respectively, while having the characteristic C1 shown in FIG. 7. The results of comparison also indicate that the ferrule product using negative thermal expansion glass ceramics A in the capillary portion 521 can extremely reduce the temperature change rate of the fiber grating Bragg wavelength, which becomes very low in particular when the diameter of the capillary portion 521 is 2 mm or greater.

Though FIG. 9 shows results concerning ferrule products whose flange portion is made of stainless steel, better characteristics are obtained when the flange portion is made of a material having a coefficient of linear expansion lower than that of stainless steel, e.g., covat.

Figure 10:
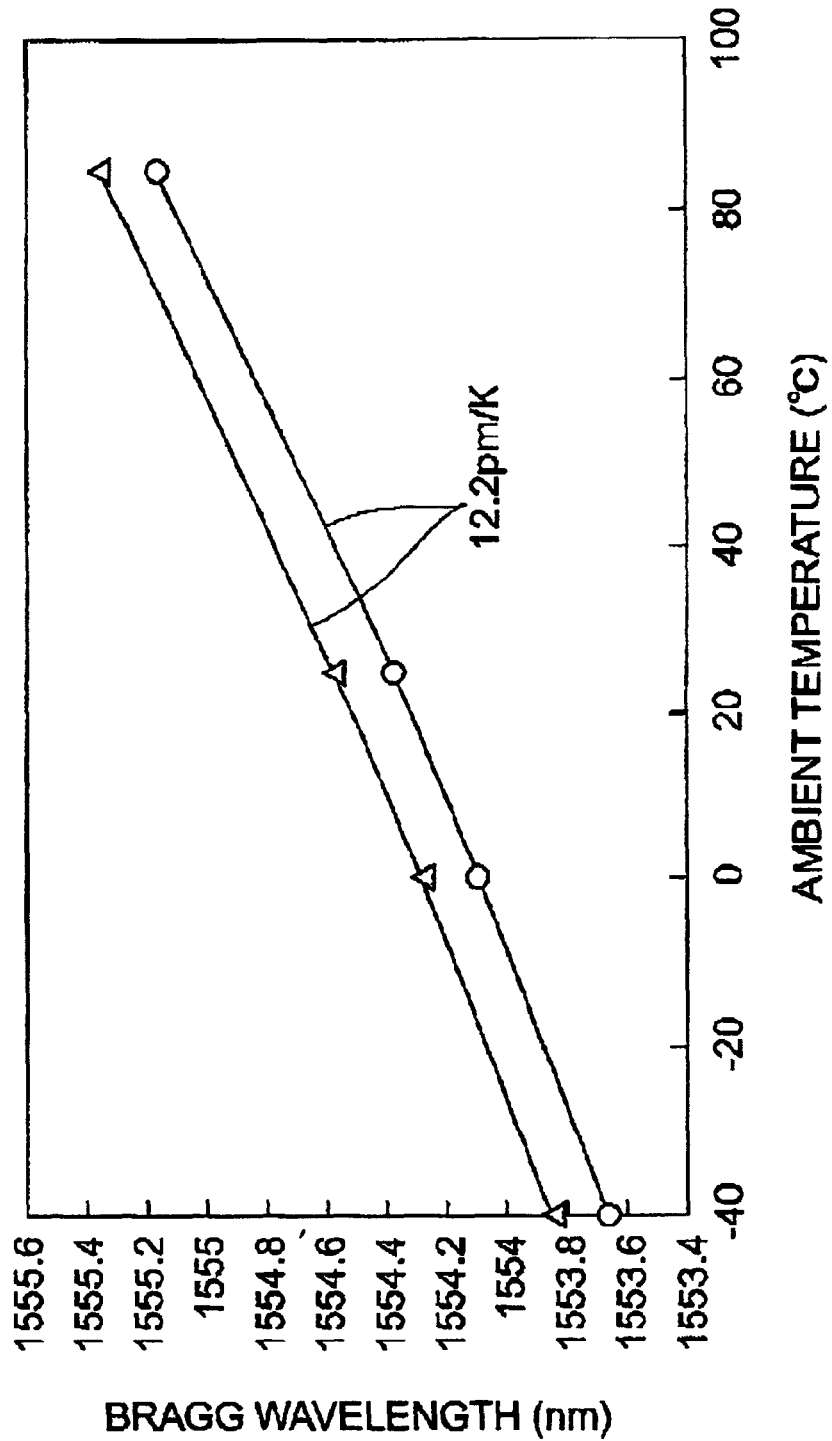
FIG. 10 is a graph showing results of actual measurement of the temperature change rate in fiber grating Bragg wavelength of the optical module shown in FIG. 5.

FIG. 10 shows results of measurement of the temperature change rate of the fiber grating Bragg wavelength. For obtaining actually measured values, the ferrule 52 and optical fiber 51 shown in FIG. 5 are utilized, stainless steel (SUS430) and crystallized glass are used as materials for the flange portion 522 and capillary portion 521, respectively. The capillary portion 521 has a diameter of 1.25 mm. The flange portion 522 has an outer diameter of 2.5 mm. The results of measurement are indicated with triangles and circles. The measured temperature change rate is 12.2 pm/K, whereas results of simulation shown in FIG. 9 is 11.0 pm/K. When the results of simulation explained in the foregoing are compared with the actually measured values, it is seen that the results of simulation are very close to the actually measured values. Therefore, the simulation provides fully reliable results.

Figure 11:
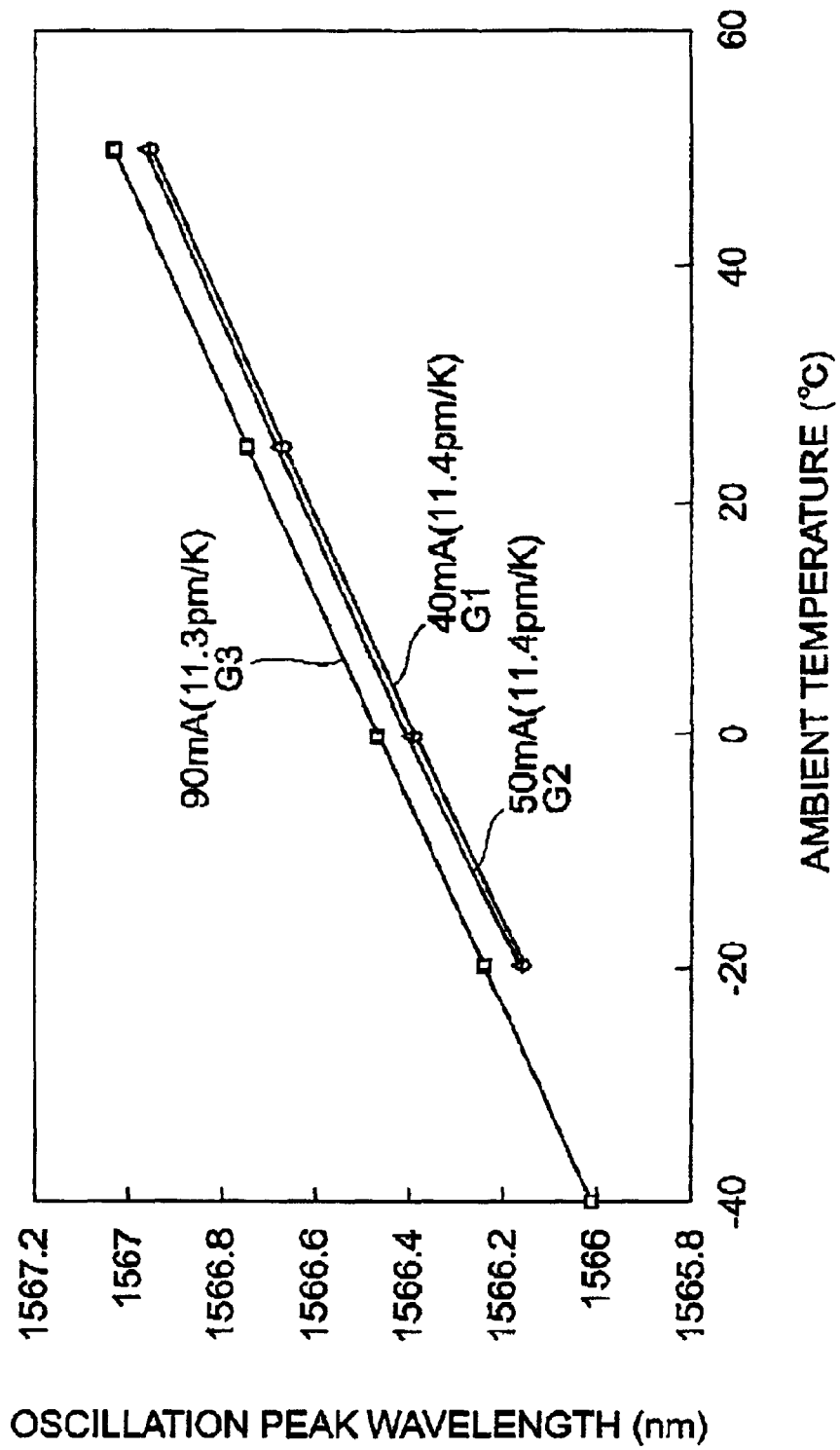
FIG. 11 is a graph showing results or actual measurement of the temperature change in oscillation peak wavelength of the optical module shown in FIG. 5.

FIG. 11 shows results of measurement of the oscillation peak wavelength of the optical module. The measurement of oscillation peak wavelength was carried out for the optical module 5 shown in FIG. 5. Stainless steel (SUS430) and crystallized glass were used as materials of the flange portion 522 and capillary portion 521, respectively. The capillary portion 521 has a diameter of 1.25 mm. The flange portion 522 has an outer diameter of 2.5 mm. Curve G1 shows a characteristic obtained when the injection current to the semiconductor optical amplifier 55 is 40 mA, in which the temperature change rate of the oscillation peak wavelength is 11.4 pm/K. Curve G2 shows a characteristic obtained when the injection current to the semiconductor optical amplifier 55 is 50 mA, in which the temperature change rate of the oscillation peak wavelength is 11.4 pm/K. Curve G3 shows a characteristic obtained when the injection current to the semiconductor optical amplifier 55 is 90 mA, in which the temperature change rate of the oscillation peak wavelength is 11.3 pm/K. At any current value, the temperature dependence of the oscillation wavelength is greatly improved as compared with the case where the comparative ferrule product is used. Also, these actually measured values are very close to the results of simulation shown in FIG. 9, i.e., 11.0 pm/K. It is understood that the temperature characteristic of oscillation peak wavelength reflects temperature characteristics of ferrule products.

Sixth Embodiment

Figure 12A:
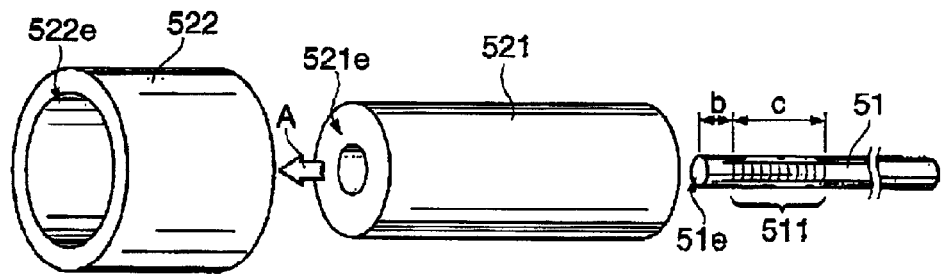
Figure 12B:
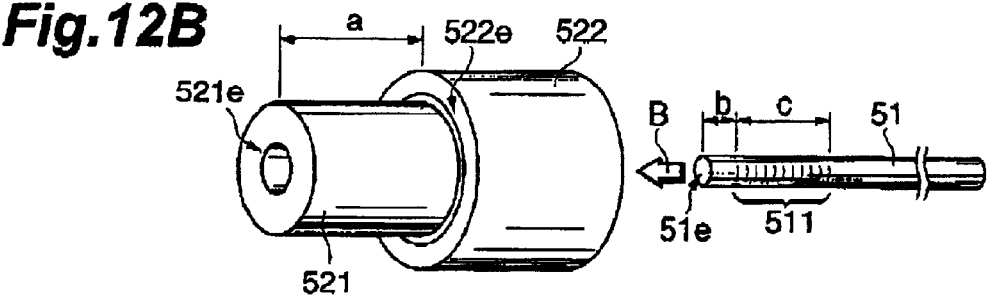
Figure 12C:
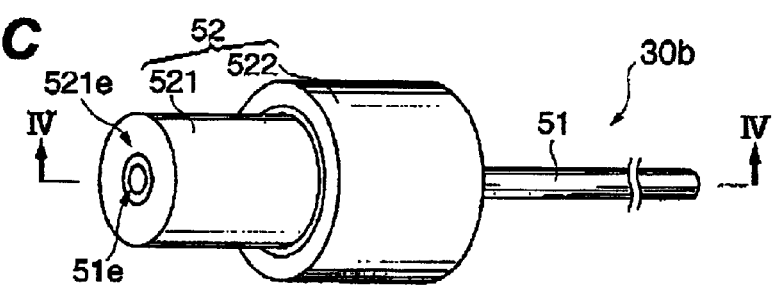

FIGS. 12A to 12C are views schematically showing a method of making a ferrule product constituted by a ferrule 52 and an optical fiber 51. These drawings show a method of making the ferrule product 30b comprising the ferrule 52 and optical fiber 51 used in the optical module 5 shown in FIG. 5. As shown in FIG. 12A, a capillary portion 521, a flange portion 522, and the optical fiber 51 are prepared. The optical fiber 51 has a fiber Bragg grating 511 at a portion separated by distance "b" from one end part 51e. The fiber Bragg grating 511 has length "c."

Figure 12D:
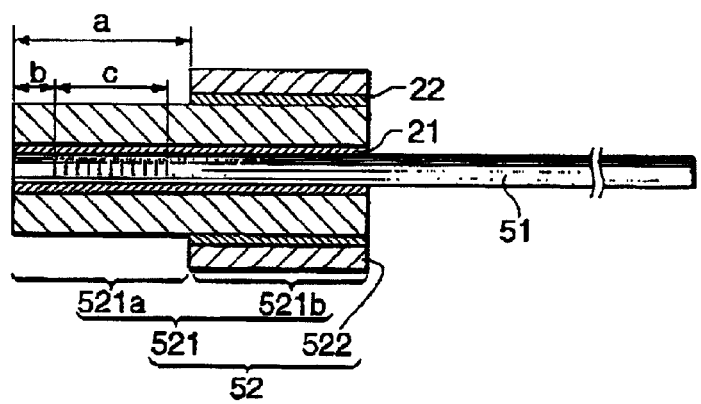
FIG. 12D is a sectional view taken along the line IV—IV shown in FIG. 12C.

The surface of the capillary portion 521 is coated with a bonding member (numeral 22 in FIG. 12D). The coated area extends from the part separated by distance "a" from one end 521e to the other end opposite from one end 521e. As shown in FIG. 12A, the capillary portion 521 is inserted into the flange portion 522 in the direction of arrow A. As shown in FIG. 12B, after the insertion, the capillary portion 521 and flange portion 522 are arranged such that one end 521e of the capillary portion 521 and one end 522e of the flange portion 522 are separated from each other by the distance "a." This arrangement can be effected by use of a positioning tool (not depicted). As can be understood from FIG. 12B, the distance "a" is longer than the sum of distances "b" and "c."

A predetermined area on the side face of the optical fiber 51 is coated with a bonding member (numeral 21 in FIG. 12D). The predetermined area extends from one end part 51e by the length of the capillary portion 521. As shown in FIG. 12B, the optical fiber 51 is inserted into the capillary portion 521 in the direction of arrow B. As shown in FIG. 12C, the optical fiber 51 is arranged with respect to the capillary portion 521 such that one end part 51e of the former is positioned at one end part 521e of the latter. FIG. 12D is a sectional view taken along the line IV—IV shown in FIG. 12C. The fiber Bragg grating 511 is held by the first portion 521a of the capillary portion 521. The flange portion 522 holds the second portion 521b of the capillary portion 521.

In this method, a thermosetting epoxy adhesive, for example, is used as the bonding members 21 and 22. In the step shown in FIG. 12C, the bonding members 21 and 22 are cured by heating. A step of curing the bonding members 21 and 22 by heating after inserting the capillary portion 521 into the flange portion 522 as shown in FIG. 12B may be added to this method. Using a bonding member including both a UV-curable material and a thermosetting material, temporary fixing may be effected by curing with UV irradiation, and then final bonding may be effected by curing with heating. When an adhesive using both UV irradiation and heating is employed, temporary fixing is effected by UV irradiation at the stage shown in FIG. 12B, and then final curing is effected by heating at the stage shown in FIG. 12C.

The optical modules shown in FIGS. 4 and 5 can realize fiber Bragg grating semiconductor lasers without temperature controllers. Also, these optical modules can use components available for typical semiconductor laser modules as the mounting member, tubular member, and ferrule holder. This makes it possible to realize low-cost fiber Bragg grating semiconductor lasers without temperature controllers.

The present invention can provide a ferrule product which can reduce the temperature change rate of the fiber grating Bragg wavelength, and a method of making the same. Further, it can provide an optical module which can reduce the temperature change rate of the oscillation wavelength of an external cavity type fiber Bragg grating semiconductor laser. Therefore, the object of the present invention is achieved.

While the principle of the present invention is illustrated and explained in preferred embodiments, one skilled in the art will recognize that the present invention can be modified in terms of arrangement and details without deviating from such a principle. Therefore, rights are demanded for all the modifications and alterations originating from the scope of claims and their spirit.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A ferrule product for use in an optical module comprising a semiconductor optical amplifier having a pair of end facets, said ferrule product comprising:

an optical fiber having one end part provided so as to be optically coupled with one of said pair of end facets, a first optical fiber portion including a fiber Bragg grating provided at a predetermined position distanced from said one end portion, and a second optical fiber portion different from said first optical fiber part; and a ferrule having a capillary portion for holding said optical fiber and a flange portion for holding said capillary portion;

wherein said flange portion is provided on said second optical fiber portion.

2. A ferrule product according to claim 1, wherein a material of said flange portion has a coefficient of linear expansion smaller than that of material of said capillary part.

3. A ferrule product according to claim 1, wherein a material of said capillary portion has a negative coefficient of linear expansion; and wherein material of said optical fiber has a positive coefficient of linear expansion.

4. A ferrule product according to claim 1, wherein material of said capillary portion has a positive coefficient of linear expansion whose absolute value is smaller than that of the coefficient of linear expansion of zirconia, whereas material of said optical fiber has a positive coefficient of linear expansion.

5. A ferrule product according to claim 1, wherein said capillary portion contains at least one material of crystallized glass and negative thermal expansion glass ceramics; and wherein said ferrule product further comprises a bonding member for bonding said capillary portion and said flange portion to each other.

6. An optical module comprising:

a semiconductor optical amplifier having a pair of end facets; and the ferrule product according to claim 1.

7. An optical module according to claim 6, wherein a material of said capillary portion has a negative coefficient of linear expansion, whereas material of said optical fiber has a positive coefficient of linear expansion.

8. An optical module according to claim 7, further comprising a mounting member, a spacer, and a ferrule holder which are arranged along a predetermined axis;

wherein said mounting member has an arrangement face extending a long a plane intersecting said predetermined axis, and a supporting portion, provided on said arrangement face, having a mounting face extending along said predetermined axis, said semiconductor optical amplifier being mounted on said mounting face;

wherein said spacer extends along said predetermined axis, and has a first end portion secured to said arrangement face of said mounting member and a second end portion secured to said ferrule holder;

wherein said ferrule holder holds said ferrule along said predetermined axis; and wherein said optical fiber is provided so as to extend along said predetermined axis.

9. An optical module according to claim 6, wherein material of said capillary portion has a positive coefficient of linear expansion whose absolute value is smaller than that of the coefficient of linear expansion of zirconia, whereas a material of said optical fiber has a positive coefficient of linear expansion.

10. An optical module according to claim 9, further comprising a mounting member, a spacer, and a ferrule holder which are arranged along a predetermined axis;

wherein said mounting member has an arrangement face extending along a plane intersecting said predetermined axis, and a supporting portion, provided on said arrangement face, having a mounting face extending along said predetermined axis, said semiconductor optical amplifier being mounted on said mounting face;

wherein said spacer extends along said predetermined axis, and has a first end portion secured to said arrangement face of said mounting member and a second end portion secured to said ferrule holder;

wherein said ferrule holder holds said ferrule along said predetermined axis; and wherein said optical fiber is provided so as to extend along said predetermined axis.

11. An optical module according to claim 6, further comprising a mounting member, a spacer, and a ferrule holder which are arranged along a predetermined axis;

wherein said mounting member has an arrangement face extending along a plane intersecting said predetermined axis, and a supporting portion, provided on said arrangement face, having a mounting face extending along said predetermined axis, said semiconductor optical amplifier being mounted on said mounting face;

wherein said spacer extends along said predetermined axis, and has a first end portion secured to said arrangement face of said mounting member and a second end portion secured to said ferrule holder;

wherein said ferrule holder holds said ferrule along said predetermined axis; and wherein said optical fiber is provided so as to extend along said predetermined axis.

12. A method of making the ferrule product according to claim 1, said method comprising the steps of:

preparing a flange member having a first length; a capillary member having a second length longer than said first length; and an optical fiber comprising a first end part and a fiber Bragg grating, said fiber Bragg being provided at a predetermined position separated from said first end part, said fiber Bragg having a third length, said capillary member comprising a first portion having at least said third length and a second portion having at least said first length;

providing said flange member at said second part of said capillary member; and inserting said optical fiber into said capillary member such that said grating is positioned at said first portion of said capillary member.

13. A ferrule product for use in an optical module comprising a semiconductor optical amplifier having a pair of end facets, said ferrule product comprising:

an optical fiber having one end portion provided so as to be optically coupled with one of said pair of end facets, and a fiber Bragg grating provided at a predetermined position distanced from said one end portion; and a ferrule having a capillary portion for holding said optical fiber and a flange portion for holding said capillary portion;

wherein a material of said capillary portion has a negative coefficient of linear expansion, whereas material of said flange portion has a positive coefficient of linear expansion.

14. A ferrule product according to claim 13, wherein said capillary portion contains a negative thermal expansion glass ceramics material having a longitudinal elastic coefficient exceeding 27 GPa.

15. A ferrule product according to claim 13, wherein said capillary portion contains a negative thermal expansion glass ceramics material having a longitudinal elastic coefficient exceeding 53 GPa.

16. A ferrule product for use in an optical module comprising a semiconductor optical amplifier having a pair of end facets, said ferrule product comprising:

an optical fiber having one end portion provided so as to be optically coupled with one of said pair of end facets, and a grating provided at a predetermined position distanced from said one end portion; and a ferrule having a capillary portion for holding said optical fiber and a flange portion for holding said capillary portion, wherein material forming said flange portion has a coefficient of linear expansion smaller than that of stainless steel.

17. An ferrule product according to claim 16, wherein said material of said flange portion has a coefficient of linear expansion smaller than that of material of said capillary portion.

18. An ferrule product according to claim 16, wherein said capillary portion contains at least one material of crystallized glass and negative thermal expansion glass ceramics; and wherein said ferrule product further comprises a bonding member for bonding said capillary portion and said flange portion to each other.

19. An optical module comprising:

a semiconductor optical amplifier having a pair of end facets; and the ferrule produce according to claim 16.

20. An optical module according to claim 19, further comprising a mounting member, a spacer, and a ferrule holder which are arranged along a predetermined axis;

wherein said mounting member has an arrangement face extending along a plane intersecting said predetermined axis, and a supporting portion, provided on said arrangement face, having a mounting face extending along said predetermined axis, said semiconductor optical amplifier being mounted on said mounting face;

wherein said spacer extends along said predetermined axis, and has a first end portion secured to said arrangement face of said mounting member and a second end portion secured to said ferrule holder;

wherein said ferrule holder holds said ferrule along said predetermined axis; and wherein said optical fiber is provided so as to extend along said predetermined axis.

21. An optical module comprising:

a semiconductor optical amplifier having a pair of end facets; and the ferrule product according to claim 13.

22. An optical module according to claim 21, further comprising a mounting member, a spacer, and a ferrule holder which are arranged along a predetermined axis;

wherein said mounting member has an arrangement face extending along a plane intersecting said predetermined axis, and a supporting portion, provided on said arrangement face, having a mounting face extending along said predetermined axis, said semiconductor optical amplifier being mounted on said mounting face;

wherein said spacer extends along said predetermined axis, and has a first end portion secured to said arrangement face of said mounting member and a second end portion secured to said ferrule holder;

wherein said ferrule holder holds said ferrule along said predetermined axis; and wherein said optical fiber is provided so as to extend along said predetermined axis.

* * * * *